(12) United States Patent  
Skatter et al.

(10) Patent No.: US 7,877,437 B1  
(45) Date of Patent: Jan. 25, 2011

(54) METHOD AND APPARATUS FOR A DISTRIBUTABLE GLOBE GRAPHICAL OBJECT

(75) Inventors: Sondre Skatter, Berkeley, CA (US); Michael Tolson, Corte Madera, CA (US)

(73) Assignee: H.E.B., LLC, Fort Worth, TX (US)

( * ) Notice: Subject to any disclaimer, the term of this patent is extended or adjusted under 35 U.S.C. 154(b) by 1464 days.

(21) Appl. No.: 09/954,724

(22) Filed: Sep. 12, 2001

Related U.S. Application Data

(63) Continuation-in-part of application No. 09/852,971, filed on May 8, 2001, now Pat. No. 7,577,700, application No. 09/954,724, which is a continuation-in-part of application No. 09/852,979, filed on May 8, 2001, now abandoned, application No. 09/954,724, which is a continuation-in-part of application No. 09/852,963, filed on May 8, 2001, now Pat. No. 7,472,157.

(60) Provisional application No. 60/202,736, filed on May 8, 2000, provisional application No. 60/202,731, filed on Aug. 8, 2000, provisional application No. 60/202,730, filed on May 8, 2000, provisional application No. 60/225,956, filed on Aug. 17, 2000, provisional application No. 60/230,341, filed on Sep. 6, 2000.

(51) Int. Cl.  
*G06F 15/16* (2006.01)  
*G06F 15/173* (2006.01)  
*G09G 5/00* (2006.01)

(52) U.S. Cl. .................. 709/203; 709/223; 345/653; 345/654

(58) Field of Classification Search ................ 345/419, 345/473, 764, 206, 653, 654; 709/206, 223, 709/203  
See application file for complete search history.

(56) References Cited

U.S. PATENT DOCUMENTS

| | | | |
|---|---|---|---|
| 5,347,632 A | | 9/1994 | Filepp et al. |
| 5,491,784 A | | 2/1996 | Douglas et al. |
| 5,557,518 A | | 9/1996 | Rosen |
| 5,561,756 A | * | 10/1996 | Miller et al. ............... 715/848 |
| 5,590,038 A | | 12/1996 | Pitroda |
| 5,629,980 A | | 5/1997 | Stefik et al. |
| 5,734,823 A | | 3/1998 | Saigh et al. |
| 5,740,364 A | | 4/1998 | Drerup |
| 5,790,790 A | | 8/1998 | Smith et al. |
| 5,794,210 A | | 8/1998 | Goldhaber et al. |
| D399,836 S | | 10/1998 | Wu et al. |
| 5,838,790 A | | 11/1998 | McAuliffe et al. |
| 5,933,811 A | | 8/1999 | Angles et al. |
| 5,945,985 A | * | 8/1999 | Babin et al. ............... 715/209 |
| 5,948,061 A | | 9/1999 | Merriman et al. |

(Continued)

OTHER PUBLICATIONS

Time and Data.com—The World Clock—Time Zones—http:www.timeanddate.com/worldclock/.*

(Continued)

*Primary Examiner*—Karen C Tang  
(74) *Attorney, Agent, or Firm*—Jackson Walker L.L.P.; Christopher J. Rourk

(57) ABSTRACT

A method and system for an interactive globe, which is use to view web content and which adds a geographic context to such content.

23 Claims, 5 Drawing Sheets

U.S. PATENT DOCUMENTS

| | | | |
|---|---|---|---|
| 5,955,961 | A | 9/1999 | Wallerstein |
| 5,982,891 | A | 11/1999 | Ginter et al. |
| 6,049,807 | A | 4/2000 | Carroll et al. |
| 6,061,448 | A | 5/2000 | Smith et al. |
| 6,061,695 | A | 5/2000 | Slivka et al. |
| 6,119,098 | A | 9/2000 | Guyot et al. |
| 6,119,137 | A | 9/2000 | Smith et al. |
| 6,119,229 | A | 9/2000 | Martinez et al. |
| 6,141,010 | A | 10/2000 | Hoyle |
| 6,151,675 | A | 11/2000 | Smith |
| 6,192,407 | B1 | 2/2001 | Smith et al. |
| 6,205,436 | B1 | 3/2001 | Rosen |
| 6,233,684 | B1 | 5/2001 | Stefik et al. |
| 6,236,971 | B1 | 5/2001 | Stefik et al. |
| 6,278,448 | B1 | 8/2001 | Brown et al. |
| 6,362,817 | B1* | 3/2002 | Powers et al. ............... 345/419 |
| 6,385,655 | B1 | 5/2002 | Smith et al. |
| 6,437,803 | B1 | 8/2002 | Panasyuk et al. |
| 6,450,407 | B1 | 9/2002 | Freeman et al. |
| 6,470,086 | B1 | 10/2002 | Smith |
| 6,487,599 | B1 | 11/2002 | Smith et al. |
| 6,490,601 | B1 | 12/2002 | Markus et al. |
| 6,499,036 | B1 | 12/2002 | Gurevich |
| 6,502,191 | B1 | 12/2002 | Smith et al. |
| 6,516,411 | B2 | 2/2003 | Smith |
| 6,529,956 | B1 | 3/2003 | Smith et al. |
| 6,546,554 | B1 | 4/2003 | Schmidt et al. |
| 6,609,196 | B1 | 8/2003 | Dickinson, III et al. |
| 6,609,658 | B1 | 8/2003 | Sehr |
| 6,615,190 | B1 | 9/2003 | Slater |
| 6,636,247 | B1 | 10/2003 | Hamzy et al. |
| 6,640,304 | B2 | 10/2003 | Ginter et al. |
| 6,647,370 | B1* | 11/2003 | Fu et al. ............... 705/8 |
| 6,651,166 | B1 | 11/2003 | Smith et al. |
| 6,687,745 | B1* | 2/2004 | Franco et al. ............... 709/219 |
| 6,745,382 | B1 | 6/2004 | Zothner |
| 6,757,712 | B1* | 6/2004 | Bastian et al. ............. 709/206 |
| 6,847,364 | B1* | 1/2005 | Dichter ............... 345/473 |
| 6,928,623 | B1 | 8/2005 | Sibert |
| 7,243,130 | B2 | 7/2007 | Horvitz et al. |
| 7,251,696 | B1 | 7/2007 | Horvitz |
| 7,266,595 | B1 | 9/2007 | Black et al. |
| 7,272,625 | B1 | 9/2007 | Hannel et al. |
| 7,299,493 | B1 | 11/2007 | Burch et al. |
| 7,330,895 | B1 | 2/2008 | Horvitz |
| 7,380,120 | B1 | 5/2008 | Garcia |
| 2001/0030667 | A1* | 10/2001 | Kelts ............... 345/854 |
| 2002/0040314 | A1 | 4/2002 | Tolson |
| 2002/0077803 | A1 | 6/2002 | Kudoh et al. |
| 2002/0103811 | A1 | 8/2002 | Fankhauser et al. |
| 2002/0120673 | A1 | 8/2002 | Tolson et al. |
| 2002/0129092 | A1 | 9/2002 | Tolson et al. |
| 2002/0174010 | A1 | 11/2002 | Rice |
| 2003/0005464 | A1 | 1/2003 | Gropper et al. |
| 2003/0016247 | A1* | 1/2003 | Lai et al. ............... 345/764 |
| 2003/0033402 | A1* | 2/2003 | Battat et al. ............... 709/224 |
| 2003/0038798 | A1* | 2/2003 | Besl et al. ............... 345/420 |
| 2003/0061463 | A1 | 3/2003 | Tibbetts |
| 2003/0105721 | A1 | 6/2003 | Ginter et al. |
| 2004/0119759 | A1* | 6/2004 | Barros ............... 345/853 |
| 2004/0193606 | A1 | 9/2004 | Aria et al. |
| 2004/0215650 | A1 | 10/2004 | Shaji et al. |
| 2005/0086326 | A1 | 4/2005 | Manning et al. |
| 2006/0059544 | A1 | 3/2006 | Guthrie et al. |
| 2006/0095779 | A9 | 5/2006 | Bhat et al. |
| 2006/0206573 | A1 | 9/2006 | Horvitz et al. |
| 2006/0218402 | A1 | 9/2006 | Kerstens et al. |

OTHER PUBLICATIONS

"PC Update Online" An introduction to Object Resource Brokers: http://www.melbpc.org.au/pcupdate/9610/9610article7.htm; pp. 1 of 4 to 4 of 4.

OMG, Object Management Group; ORB BAsics: wysiwyg://28/ http://www.omg.org/gettingstarted/orb_basics.htm; pp. 1 of 8 to 8 of 8.

OMG, Object Management Group: CORBA BASICS; CORBA FAQ; wysiwyg://26/http://www.omg.org/gettingstarted/corbafaq. htm; pp. 1 of 6 to 6 of 6.

OMG, Object Management Group: Introduction to OMG'S Specifications: wysiwyg://11/http://www.omg.org/gettingstarted/specintro. htm: pp. 1 of 5 to 5 of 5.

The Liberty Alliance Project, "Introduction to the Liberty Alliance Identity Architecture," Revision 1.0, Mar. 2003 edition, http://www.projectliberty.org (14 pgs.)

Time and Data.com—The World Clock—Time Zones—http://www.timeanddate.com/worldclock/; Copyright Steffen Thorsen 1995-2005 (3 pgs.)

Search Report for PCT/US001/028150, mailed Dec. 14, 2001, 5 pgs.

* cited by examiner

```xml
<?xml version="1.0" encoding="UTF-8" ?>
<Globe_Channel name="Web Portals">
<map type="geographic" transparent="on" />
<Alerts>
<Alert Category="Portal" Longitude="-121.93" Latitude="48.0" Text="Yahoo
    Canada" URL="http://ca.yahoo.com/" />
<Alert Category="Portal" Longitude="149.13" Latitude="-35.25" Text="Yahoo
    Australia" URL="http://au.yahoo.com" />
<Alert Category="Portal" Longitude="139.76" Latitude="35.7" Text="Yahoo
    Japan" URL="http://www.yahoo.co.jp" />
<Alert Category="Portal" Longitude="7.1" Latitude="50.73" Text="Yahoo
    Germany" URL="http://de.yahoo.com" />
<Alert Category="Portal" Longitude="2.3" Latitude="48.86" Text="Yahoo
    France" URL="http://fr.yahoo.com" />
<Alert Category="Portal" Longitude="116.4" Latitude="39.9" Text="Yahoo
    China" URL="http://chinese.yahoo.com/" />
<Alert Category="Portal" Longitude="10.75" Latitude="59.9" Text="Yahoo
    Norway" URL="http://no.yahoo.com" />
<Alert Category="Portal" Longitude="-122.4" Latitude="37.79" Text="Yahoo
    USA" URL="http://www.yahoo.com" />
<Alert Category="Portal" Longitude="4.0" Latitude="47" Text="Lycos France"
    URL="http://www.lycos.fr" />
<Alert Category="Portal" Longitude="-0.167" Latitude="51.2" Text="Lycos
    UK" URL="http://www.lycos.co.uk" />
<Alert Category="Portal" Longitude="-80" Latitude="40.4" Text="Lycos US"
    URL="http://www.lycos.com" />
<Alert Category="Portal" Longitude="28" Latitude="-25.5" Text="South
    African Portal" URL="http://www.ananzi.co.za" />
<Alert Category="Portal" Longitude="174.78" Latitude="-41.3" Text="New
    Zealand Portal" URL="http://www.searchnz.co.nz" />
<Alert Category="Portal" Longitude="35.2" Latitude="31.79" Text="Israeli
    Portal" URL="http://english.nana.co.il/" />
</Alerts>
</Globe_Channel>
```

Figure 4

METHOD AND APPARATUS FOR A DISTRIBUTABLE GLOBE GRAPHICAL OBJECT

CROSS REFERENCE TO RELATED APPLICATIONS

This application claims benefit of priority from provisional patent application 60/202,736 filed May 8, 2000, incorporated herein by reference.

This application claims benefit of priority from provisional patent application 60/202,731 filed May 8, 2000, incorporated herein by reference.

This application claims benefit of priority from provisional patent application 60/202,730 filed May 8, 2000, incorporated herein by reference.

This application claims benefit of priority from provisional patent application 60/225,956 filed Aug. 17, 2000, incorporated herein by reference.

This application claims benefit of priority from provisional patent application 60/230,341 filed Sep. 6, 2000, incorporated herein by reference.

This application claims benefit of priority and is a continuation in part of patent application Ser. No. 09/852,971 filed May 8, 2001, incorporated herein by reference.

This application claims benefit of priority and is a continuation in part of patent application Ser. No. 09/852,979 filed May 8, 2001, incorporated herein by reference.

This application claims benefit of priority and is a continuation in part of patent application Ser. No. 09/852,963 filed May 8, 2001, incorporated herein by reference.

COPYRIGHT NOTICE

Pursuant to 37 C.F.R. 1.71(e), applicant notes that a portion of this disclosure contains material that is subject to copyright protection (such as, but not limited to, source code listings, screen shots, user interfaces, or user instructions, or any other aspects of this submission for which copyright protection is or may be available in any jurisdiction.). The copyright owner has no objection to the facsimile reproduction by anyone of the patent document or patent disclosure, as it appears in the Patent and Trademark Office patent file or records, but otherwise reserves all copyright rights whatsoever.

FIELD OF THE INVENTION

The present invention relates to the field of information and/or data handling methods and systems. In specific embodiments, the present invention involves methods and/or systems directed to providing content accessible over a network that is linked to geographic positions on a representation of the earth and that can exist in a variety of software environments.

BACKGROUND OF THE INVENTION

Familiarity with information and data handling methods and techniques is characteristic of practitioners in the art and is presumed of the reader. At the present time, many people are familiar with accessing information over a data network. The WWW is a public data network that is becoming increasingly used for accessing multi-media information. This information can be one-way, passively experienced information, or two-way information including two-way text, audio, or video data.

At the present time, many people are familiar with accessing information over a data network. The WWW is a public data network that is becoming increasingly used for accessing multi-media information. This information can be one-way, passively experienced information, or two-way information including two-way text, audio, or video data.

At the present time, there is a desire to enrich the user experience. One particular aspect of typical WWW interactions is that interactions take place within the confines of an application, such as a browser.

In one view, it can be understood that an inherent feature of the World Wide Web is that physical geography generally is eliminated. Navigation and places are defined in terms of names (URL's) and this URL's often mask the physical location of servers. However, in many situations it is convenient to have the geographical context when viewing web content.

SUMMARY OF THE INVENTION

The present invention, in various aspects, involves a method and/or system and/or apparatus for providing an enhanced user interaction in an information processing environment. According to specific embodiments, the invention offers a means to re-establish geography as an important filtering mechanism for information, and allows web content to be projected onto a globe in such a way that the content is presented in relation to a specific geographic location.

In the present discussion, information available over a public network may be referred as contained in documents or presentations or compositions. It should be understood that the terms information or document refer to any type of digitally-encoded data that can be presented or transmitted by a computer or other digital device including, but not limited to, text, graphics, photos, executable files, data tables, audio, video, three dimensional data, or multimedia data that is a combination of any of these.

In a further embodiment, the invention comprises a new method for allowing an agent to be moved from a browser application to a desktop or to another platform.

A further understanding of the invention can be had from the detailed discussion of specific embodiments below. For purposes of clarity, this discussion refers to devices, methods, and concepts in terms of specific examples. However, the method of the present invention may operate in a wide variety of applications. It is therefore intended that the invention not be limited except as provided in the attached claims.

Furthermore, it is well known in the art that computer systems can include a wide variety of different components and different functions in a modular fashion. Different embodiments of the present invention can include different mixtures of elements and functions and may group various functions as parts of various elements. For purposes of clarity, the invention is described in terms of systems that include different innovative components and innovative combinations of components. No inference should be taken to limit the invention to combinations containing all of the innovative components listed in any illustrative embodiment in this specification.

Furthermore, it is well known in the art of internet applications and software systems that particular file formats, languages, and underlying methods of operation may vary. The disclosure of a particular implementation language or format of an element should not be taken to limit the invention to that particular implementation unless so provided in the attached claims.

All publications, patents, and patent applications cited herein are hereby incorporated by reference in their entirety for all purposes. The invention will be better understood with reference to the following drawings and detailed description.

BRIEF DESCRIPTION OF THE DRAWINGS

FIG. 4 illustrates an example of a channel description using XML representation according to specific embodiments of the present invention.

DESCRIPTION OF SPECIFIC EMBODIMENTS

Embodiment as-Globe Voii

The invention may be embodied in various particular envoys (or envoii's) providing particular types of display. In specific embodiments, one aspect of the invention may be referred to as GlobeVoii™. As will be understood from these teachings and the illustrations, GlobeVoii is a globe, in virtual three-dimensions, that spins and can display various information.

In a basic form. GlobeVoii has a physical map that is texture-mapped on the 3d sphere. The light source is the relative position of the sun so that the GlobeVoii display is a real time sun clock, where a viewer can see the amount of daylight in the different parts of the world.

As will be understood from the teachings herein, a GlobeVoii can be implemented according to the specific envoii system discussed herein.

In other embodiments, the invention may also be implemented using other appropriate display or encoding systems, such as in JAVA, Flash, or any other programming language.

GlobeVoii—Description

According to specific embodiments of the present invention, GlobeVoii is a software application that can run on an Envoii platform (as described in above referenced patent applications) and which generally can be executed in Netscape, Internet Explorer, on the desktop or as a standalone application—on PC (Windows 95/98/Me/NT/2000) and Mac OS 9. GlobeVoii offers a way to transform web content, and links to web content, onto the surface of a 3D globe so that the content appears at the associated geographic locations.

Channels

At a given time the globe is populated by a content channel. A channel can be provided by a single content provider, an association of content providers, or a broker of content, in which case the content are links to web content provided by third party content providers. In all these cases the channel provider refers to the agent editing the content of the channel.

According to specific embodiments, a user of GlobeVoii can select from a variety of channels to populate the globe. When selected, a channel exclusively populates the globe. This is analogous to TV channels, where the user can view only one channel at the time.

Figure 1:
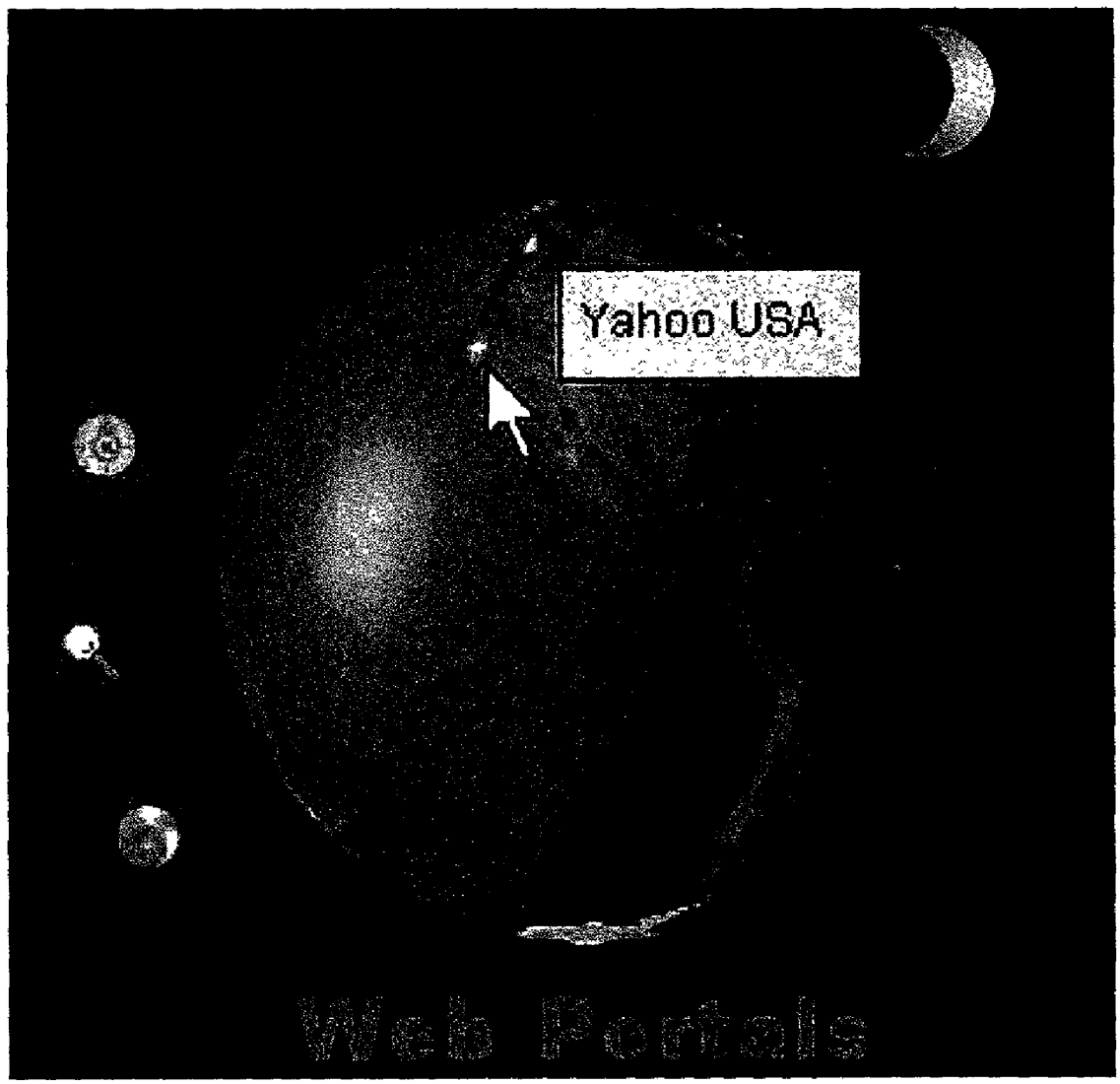
FIG. 1 illustrates a globe envoy according to specific embodiments of the present invention showing the portal channel.
Figure 2A:
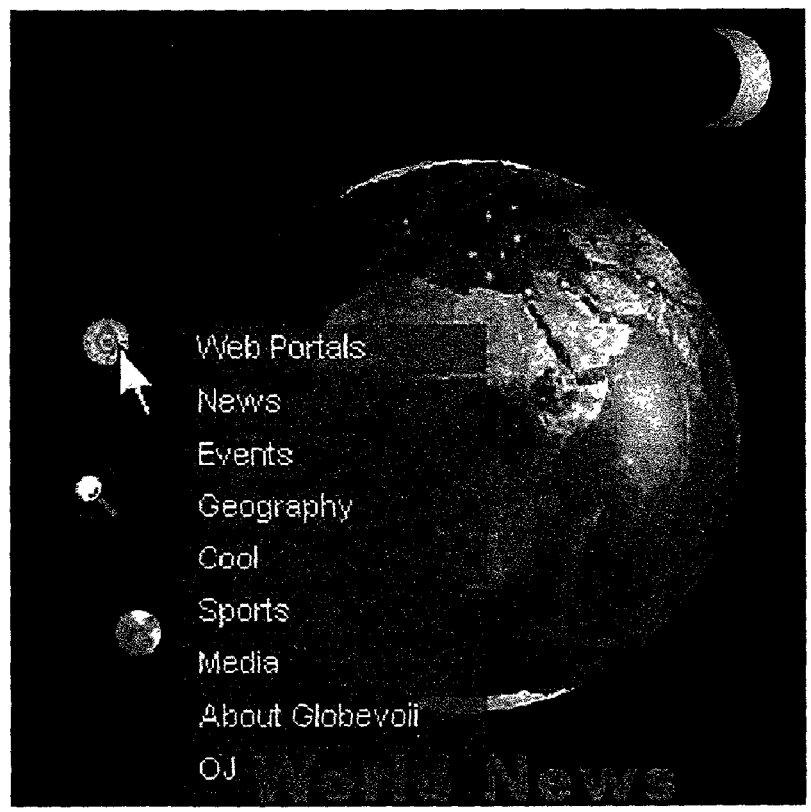
FIGS. 2A and B illustrate examples of accessing a channel selection menu according to specific embodiments of the present invention.
Figure 2B:
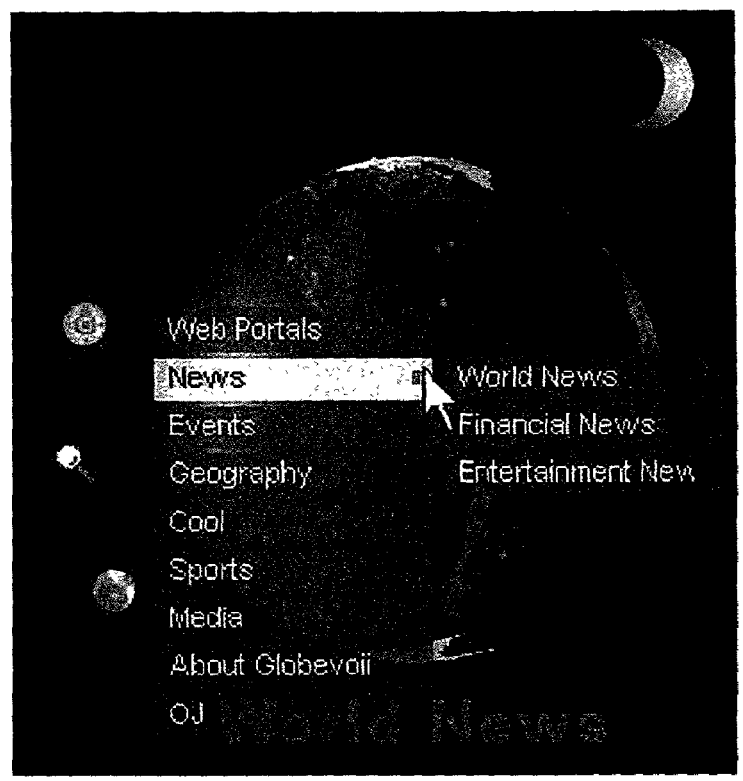

In specific example embodiments, a channel is described in XML format (Web portal channel example, and see FIG. 1 for appearance of channel on GlobeVoii), and is retrieved from a server using an http request. Typically, this is a small feed no more than 10 kb. The channel XML can be provided as a static (but frequently updated) XML file on a web server, or it could be generated by a server side agent (cgi script or servlet), as a response to the http request. The latter case supports personalization of channels for the end user.

Channels Selection

According to specific embodiments of the present invention, a GlobeVoii client application queries a server for the set of available channels. This is done using http request, and again the available channels, their order of appearance and hierarchy, can be defined in XML or using any convenient data representation. Again, in specific example implementations, either a static XML file can be used, or more flexibly, the channel selection is customized to each user by a server side script generating the channel selection upon the request.

End Users

In specific example embodiments, an end user of GlobeVoii obtains the globe either by referral from others, or through a customer relationship to a content provider who provides a channel. The application is free for the end user.

Elements in a Channel

According to various embodiments of the present invention, a wide variety of content elements can be used. A content element can refer either to one or more points on the globe (such as one or more cities) or could apply to a region such as a country.

Hotpoints (or Alerts)

According to specific embodiments of the present invention, a "Hotpoint" can be displayed on a globevoii. Hotpoints can appear as blinking points on the globe surface, appearing at the geographical location of the associated content element. If desired, this point can be a hyperlink, allowing a user to click on it and open a new browser window will open with and associated URL. In specific embodiments, mouse rollover reveals a description of the content to give the user information about the hotpoint before selection. In certain cases there is no need for URL, for example in a weather channel, the necessary information can be displayed on a mouse rollover.

For some channels, hotpoints can be alerts that something happened at the given location, for example for news and/or event channels. The user can quickly assess whether events of interest have happened in areas of interest—and sometimes more important—that nothing has happened here. A typical example of alert hyperlink channels is a news channel. For the news channel each alert will appear in the city the news was reported, and by clicking on the alert the end user will obtain the original news story as formatted by news provider. This type of channel is very dynamic in that the location of the alerts will constantly change. Hence, just by looking at the globe a user can quickly assess a current world-wide news picture.

In other channels, hotpoints may occur at the same position every day but the content associated with them might vary. This is true for weather channels containing e.g. temperature, or with links to weather organization.

Other Actions than Hyperlink

In specific embodiments, the default behavior when clicking a hotpoint is that a browser window opens with the associated URL. However, other possibilities of click action include:

Content is retrieved and displayed in a formatted fashion within the GlobeVoii application. Similarly to the hyperlink a URL with the path of the content is contained the alert.

The content element can represent a person, maybe another GlobeVoii user, and the action linked to selection of content element will be initiation of communication to this user either through email, chat, or sending an instant message. Parameter: mailto URL or instant messaging address An http post request is submitted, which initiates or completes, a web service associated with the Channel provider (e.g. booking a flight with a travel agency being the channel provider). Parameter: IP request address, and post data No action. This is an inactive content element. It still holds information in the rollover text and the position of point.

Region Specific Content—Hot Area

In further embodiments, alerts do not necessarily apply to distinct locations but can apply to regions. For example, in a currency channel, the content will change according to countries, and in a world clock channel the content would change according to the time zones. This content can appear on the globe not as blinking points but as highlighted areas. These areas will behave similarly to the hotpoints on rollover and selection (click).

Maps

The map on the globe can be specified in the channel XML description. Standard maps of different resolutions can be specified (e.g. geographic low resolution, or political map high resolution) in which globevoii's maps will be used, or the channel provider can specify a map on a given server. For example a weather channel could use a satellite picture as the globe map, and have it updated with certain time intervals.

Behavior and Customized User Interface for a Channel

According to specific embodiments of the present invention, a channel provider can create added user interface and behavior for a channel by using the Envoii SDK (System Developers Kit)

Example Features and User Interface of Globevoii

Daylight Display

In specific embodiments, a light source of the 3d shading is the relative position of the sun so that the GlobeVoii display is a real time sun clock, where a viewer can see the amount of daylight in the different parts of the world.

Spinning

When the mouse cursor is outside the globe, the globe rotates around its axis while the alerts are blinking. This gives the user a chance to scan the whole world during one rotation. Rotation time can be selected by the user, a typical value is 20 seconds.

In specific embodiments, when a pointer cursor enters the display area of the globe, the globe stops spinning. Spinning is reactivated when the cursor moves out of the globe. Further, there can be an adjustable timeout that stops the spinning when a user device is inactive for a period.

Rotating the Globe by Hand

In further embodiments, using a pointer click-and-drag, a user can rotate the globe to a desired orientation. In some embodiments, a cursor must be put down outside of a hotpoint or a hot area to activate this function. In other embodiments, this can be set as the default single-click function and selection of hotpoints set as the double click function. In still further embodiments, this can be set vice versa.

Interacting with Alerts

Because in specific embodiments, GlobeVoii stops spinning when the mouse cursor is inside the globe it easy to interact with the content elements. Pointer rollover and click are the key means of interaction.

Zoom

In specific embodiments, a zoom tool can help the user resolve hot points when they are close together. The zoom can be chosen from a button, appearing as a satellite of GlobeVoii, different strength or no zoom. The zoom tools adds a field of enlargement around the mouse as the user moves the mouse over the globe, surface with the mouse position as the zoom center.

Channel Selection

A button, in the position of a satellite, allows the user to select channels from a hierarchical menu.

Preferences

A third satellite provides access to a preference panel where properties such as rotation period, transparency, true daylight shading, and map selection can be set. These settings can be sometimes preset for a given channel, and will thus override the current setting when changing channel.

Minimizing and Relocating GlobeVoii

Figure 3:
FIG. 3 illustrates an example of a globe envoy positioned on a desktop according to specific embodiments of the present invention.

According to specific embodiments of the present invention, a fourth UI elements in the shape of a moon can be used to minimize and maximize GlobeVoii. In the minimized state the user can move GlobeVoii, either within its current space (window) or to another Envoii place such as the desktop. In FIG. 3, a GlobeVoii is shown as appearing on the desktop.

Non-UI Elements

In specific embodiments, there is a text underneath GlobeVoii with the name of the current channel. There is also a logo or some branding image at the globe (in the Pacific), if specified in the channel. There can also be banner ads appearing around GlobeVoii for limited time periods depending on agreements with channel provider.

Implementation Details/enablement for GlobeVoii

According to specific embodiments of the present invention, a 3D rendering engine of the Envoii Engine is used in GlobeVoii. This engine is triangle based and renders geometry given in the .obj format with transparency and anti-aliasing. A world map, with linear, rectangular projection, is used as a texture map. A rendering sub system, also supported by the Envoii engine is used to superimpose content elements onto the world map, before used as input in the 3D object. The zoom feature is also implemented within the 3D rendering engine. Given a input x y position in picture coordinates the texture coordinates are perturbed to produce the zoom effect.

In specific example embodiments, the user interface and behavior of GlobeVoii uses the Envoii event manager, which delivers the following generalized events: OnPointerMove (when mouse cursor is moved), OnTouch (When clicking on a graphics element), OnTouchAnywhere (when clicking anywhere in the composition), OnEnter (when graphics element receives mouse focus), OnExit (when graphics element looses mouse focus).

Each graphics element can have one or more behaviors attached to it, manifested by a Java class. These entities can communicate between them using a messaging mechanism of the Envoii engine based on names of the entities (Envoiis).

Interaction between Envoiis can also happen using property name space, and interface for setting and getting properties.

Creating a Channel

According to specific embodiments of the present invention, a channel is described using XML (see FIG. 4). This description is generally available over the web using an http request. It can either exist as a static file on a web server, or the http request can trigger a server side script returning customized/personalized channel description.

Generally, the name of the channel in the second line of the XML document will appear underneath the globe when the channel is loaded. The map type specification in this case will pick one of the maps included in the GlobeVoii application. One can also specify the URL to another map. The maps needs to be linear projection of a specified size. The 'Transparent' tag refers to whether or not the globe be transparent, showing the back side.

In the 'Alerts' section all the hotpoints, or Alerts, are defined. Each Alert has a category, which will affect the action at click and the behavior at rollover. The 'Longitude' and 'Latitude' must always be present, and determines the position of the alert. The 'URL' tag is used for the click event. If the category of the alert instead was a chat channel, with a list of your friends at different geographical location, then instead of URL there would be an Instant Messaging address (or a mailto URL), and the click action would trigger an Instant Messaging session.

For channels that update frequently, for example news channels, server side programs can generate the Channel XML automatically at certain time intervals.

Publishing a Channel

In order to publish a GlobeVoii channel to GlobeVoii end users, a channel provider generally coordinates this with the GlobeVoii application provider (Envoii Inc., or licensee of Envoii Inc.). Licenses for management of a whole subset of channels is also possible. This is a good alternative for e.g. other languages, or special interest groups.

The Business of GlobeVoii

In a specific embodiment, a system and/or method according to the invention provides a business arrangement wherein the owner of a GlobeVoii application, licenses channels to GlobeVoii channel providers. These licensees are normally in the web content delivery business, or a portal. Different alternatives can be negotiated; pay per channel or pay per use. In the pay-per-use case the basis will be number of clicks on alerts per channel. Various channels-based web business arrangements are known, such as RealPlayer™ channels, but as far as is known, the current inventions linking of channels with a graphical object including specific meaningful locations on the object, is unique. This aspect of the invention is specifically described herein with respect to a globe graphical object, but the general technique has applications to other graphical objects, such as, for example, a representation of a human body or a representation of a car, or a representation of a house.

According to specific embodiments of the present invention, channels are sorted by category, for example news, weather, entertainment. With a situation of many channels, good exposure of the channel to the end user will be key for the channel provider—analogous to a good domain name on the internet.

Embodiment in a Programmed Digital Apparatus

The invention may be embodied in a fixed media or transmissible program component containing logic instructions and/or data that, when loaded into an appropriately configured computing device, cause that device to perform according to the invention.

Figure 5:
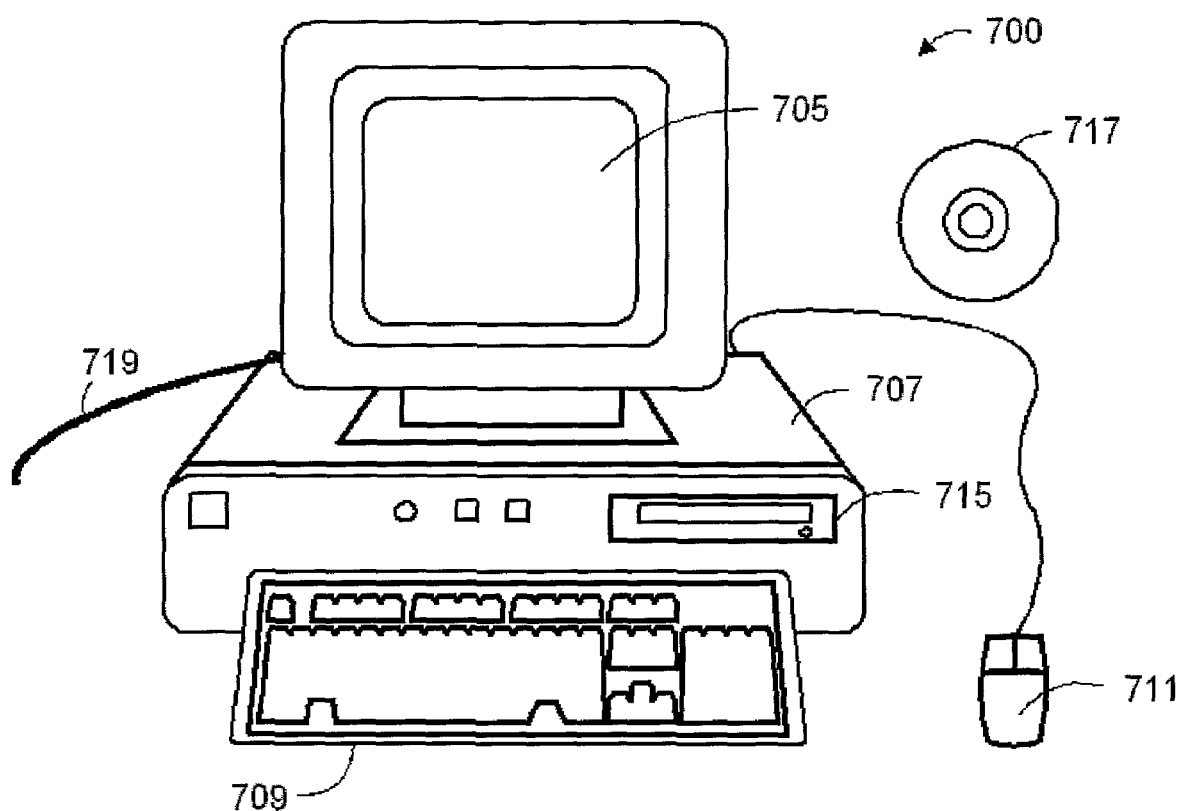
FIG. 5 is a block diagram showing a representative example logic device in which various aspects of the present invention may be embodied.

FIG. 5 is a block diagram showing a representative example logic device in which various aspects of the present invention may be embodied. FIG. 5 shows digital device 700 that may be understood as a logical apparatus that can read instructions from media 717 and/or network port 719. Apparatus 700 can thereafter use those instructions to direct a method of image interpolation. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention also may be embodied within the circuitry of an application specific integrated circuit (ASIC) or a programmable logic device (PLD). In such a case, the invention may be embodied in a computer understandable descriptor language which may be used to create an ASIC or PLD that operates as herein described.

The invention also may be embodied within the circuitry or logic processes of other digital apparatus, such as cameras, displays, image editing equipment, etc.

CONCLUSION

The invention has now been explained with regard to specific embodiments. Variations on these embodiments and other embodiments will be apparent to those of skill in the art. The invention therefore should not be limited except as provided in the attached claims.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of presenting data over a network comprising:
   providing on a display device of a data processor a persistent graphical object representing a rotating globe that depicts a plurality of geographical points and a plurality of geographical regions representative of geographical locations of a physical world;
   extracting from a data memory a plurality of content elements from at least one data file, at least one of the content elements conveying information related to at least one geographical location of the physical world;
   superimposing the at least one content element on the graphical object at the geographical point or geographical region that is representative of the geographical location of the physical world to which the content element relates;
   presenting said graphical object in a composition accessed by an initial application, said object having state and having one or more external connections;

allowing a user to indicate relocation of said graphical object to a location outside of said initial application; and thereafter moving said graphical object to said outside location, preserving state of said graphical object.

2. The method according to claim 1 wherein said graphical object, once relocated, will persist and maintain state after termination of said initial application.

3. The method according to claim 1 wherein said initial application location is a web browser and said new location is a desktop provided by an operating system.

4. The method according to claim 1 wherein at least some of said content elements convey at least one of the following types of information:

one or more images indicating weather in various locations; and one or more links indicating news stories related to a particular location displayed on said globe.

5. The method according to claim 1 wherein said relocation may be repeated from a current location to any number of additional platforms.

6. The method according to claim 3 wherein said desktop provided by an operating system is an interface of a platform, said platform selected from the group consisting of: a windows personal computer, a Macintosh personal computer, a Unix-type operating system, a set-top box, a wireless logic appliance, an internet appliance, a personal digital assistant, or another device connected to a network.

7. The method according to claim 1 wherein said new location is selected from the group consisting of: a desktop provided by an operating system, and a different computer platform with a different operating system.

8. The method according to claim 1 wherein said graphical object comprises:

one or more user interface components and wherein said components are preserved after a relocation; and one or more connections to one or more external entities and wherein said connections are persistent.

9. The method according to claim 1 wherein said allowing a user to indicate relocation comprises selecting and dragging a graphical object.

10. The method according to claim 1 wherein said allowing a user to indicate relocation comprises discontinuously selecting a graphical object and placing said object in a new location.

11. The method according to claim 8 wherein said one or more external entities are selected from the group consisting of: web servers, other applications, background processes, and other remote processes.

12. An electronic data processing system presenting web content comprising:

an information appliance displayable representation of a globe, where the globe is persistent and is displayed using an electronic data hardware processing device to provide three dimensional software rendering and wherein the globe depicts a plurality of geographical points and a plurality of geographical regions representative of geographical locations of a physical world;

a logic module that projects web content onto the surface of said representation of the globe:

wherein the logic module is configured to extract a plurality of content elements from at least one electronic data file of a separate application, at least one of the content elements conveying information related to at least one geographical location of the physical world; and wherein the logic module is configured to superimpose the at least one content element on the globe at the geographical point or geographical region that is representative of the geographical location of the physical world to which the content element relates.

13. A system according to claim 12 wherein said information appliance is configured to provide the representation of the globe through a web browser operating on the electronic data hardware processing as embedded in a web page and can be relocated to reside on an operating system desktop.

14. A system according to claim 12 further comprising means for rendering web content on the globe as channels, wherein a channel is a set of related content from a content provider, an association of content providers, or a broker of web content, and wherein a content item in a channel has a geographical distribution.

15. A system according to claim 14 further comprising means for associating the content item with points on said representation of the globe or regions on said representation of the globe.

16. A system according to claim 14 further comprising means for providing a textual window that will pop up that reveals details about the content item when a cursor is moved over the content item.

17. A system according to claim 14 further comprising means for associating the content item with actions that are triggered when a user selects the content item.

18. A system according to claim 17 wherein said actions are one or more selected from the group consisting of:

opening a web browser with a Uniform Resource Locator link as a parameter;

bringing content to the globe with a parameter the web address of content; and initiation of communication to a user of a persistent graphical object representing a rotating globe that depicts a plurality of geographical points and a plurality of geographical regions representative of geographical locations of a physical world through email, chat, or sending an instant message.

19. A system according to claim 14 further comprising means for defining channels using Extensible Markup Language format describing content at least in terms of geographic position, click-action, and parameters for click action.

20. A system according to claim 19 wherein channels reference persistent user application sub-compositions configured to be added dynamically to an application that creates a persistent graphical object representing a rotating globe that depicts a plurality of geographical points and a plurality of geographical regions representative of geographical locations of a physical world.

21. A system according to claim 14 comprising means for licensing channels to channel providers on a pay per channel, pay per end user, or a pay per user action basis.

22. A system according to claim 14 wherein a texture map rendered on said representation of the globe is part of a separate two dimensional rendering system, said two dimensional rendering system comprising a local display managing system for managing repainting damages.

23. A system according to claim 14 wherein a representation of the globe is configured to display real time daylight illumination of Earth using three dimensional shading.

* * * * *